(12) United States Patent
Hathaway

(10) Patent No.: US 9,383,505 B2
(45) Date of Patent: Jul. 5, 2016

(54) HIGH OUTPUT LED BASED ILLUMINATOR THAT REPLACES CCFLS FOR LCD BACKLIGHTS

(76) Inventor: Kevin J. Hathaway, Saratoga, CA (US)

(*) Notice: Subject to any disclaimer, the term of this patent is extended or adjusted under 35 U.S.C. 154(b) by 1800 days.

(21) Appl. No.: 12/514,932

(22) PCT Filed: Nov. 15, 2007

(86) PCT No.: PCT/US2007/024086
§ 371 (c)(1),
(2), (4) Date: May 14, 2009

(87) PCT Pub. No.: WO2008/060623
PCT Pub. Date: May 22, 2008

(65) Prior Publication Data
US 2010/0066947 A1    Mar. 18, 2010

Related U.S. Application Data

(60) Provisional application No. 60/859,427, filed on Nov. 15, 2006.

(51) Int. Cl.
| G02B 6/00 | (2006.01) |
| G02F 1/13357 | (2006.01) |
| F21V 8/00 | (2006.01) |
| G02F 1/1335 | (2006.01) |

(52) U.S. Cl.
CPC ............ *G02B 6/0073* (2013.01); *G02B 6/0068* (2013.01); *G02B 6/0085* (2013.01); *G02F 2001/133628* (2013.01)

(58) Field of Classification Search
USPC .......................................................... 349/69
See application file for complete search history.

(56) References Cited

U.S. PATENT DOCUMENTS

| 5,661,645 | A | * | 8/1997 | Hochstein ........................ 363/89 |
| 5,786,665 | A | * | 7/1998 | Ohtsuki et al. ................. 313/512 |
| 6,566,689 | B2 | * | 5/2003 | Hoelen et al. ..................... 257/89 |
| 6,577,073 | B2 | * | 6/2003 | Shimizu et al. ................. 315/246 |
| 7,365,371 | B2 | * | 4/2008 | Andrews .......................... 257/99 |
| 7,473,022 | B2 | * | 1/2009 | Yoo ................................. 362/621 |
| 7,808,013 | B2 | * | 10/2010 | Mendendorp et al. .......... 257/99 |
| 2005/0157500 | A1 | * | 7/2005 | Chen et al. ..................... 362/294 |
| 2010/0225423 | A1 | * | 9/2010 | Eddy et al. ..................... 333/230 |

* cited by examiner

*Primary Examiner* — Michelle R Connelly
(74) *Attorney, Agent, or Firm* — Donald E. Schreiber

(57) ABSTRACT

A LCD illuminator (20), when energized, emits light which impinges upon an input surface of a light pipe included in a LCD module (54). The LCD illuminator (20) includes a thermally-conductive housing (22) to which a thin, thermally conductive printed circuit board ("PCB") (32) is mechanically and thermally bonded. The PCB (32) has an array of LED die (34) mounted thereon that face away from the thermally conductive housing (22). A layer of thermal interface material (56) interposed between an outer surface of the thermally conductive housing (22) and the LCD module (54) facilitates conducting heat generated by the LED die (34) out of the LCD module (54). Also disclosed is an improved LCD module (54) that includes the disclosed LCD illuminator (22).

46 Claims, 6 Drawing Sheets

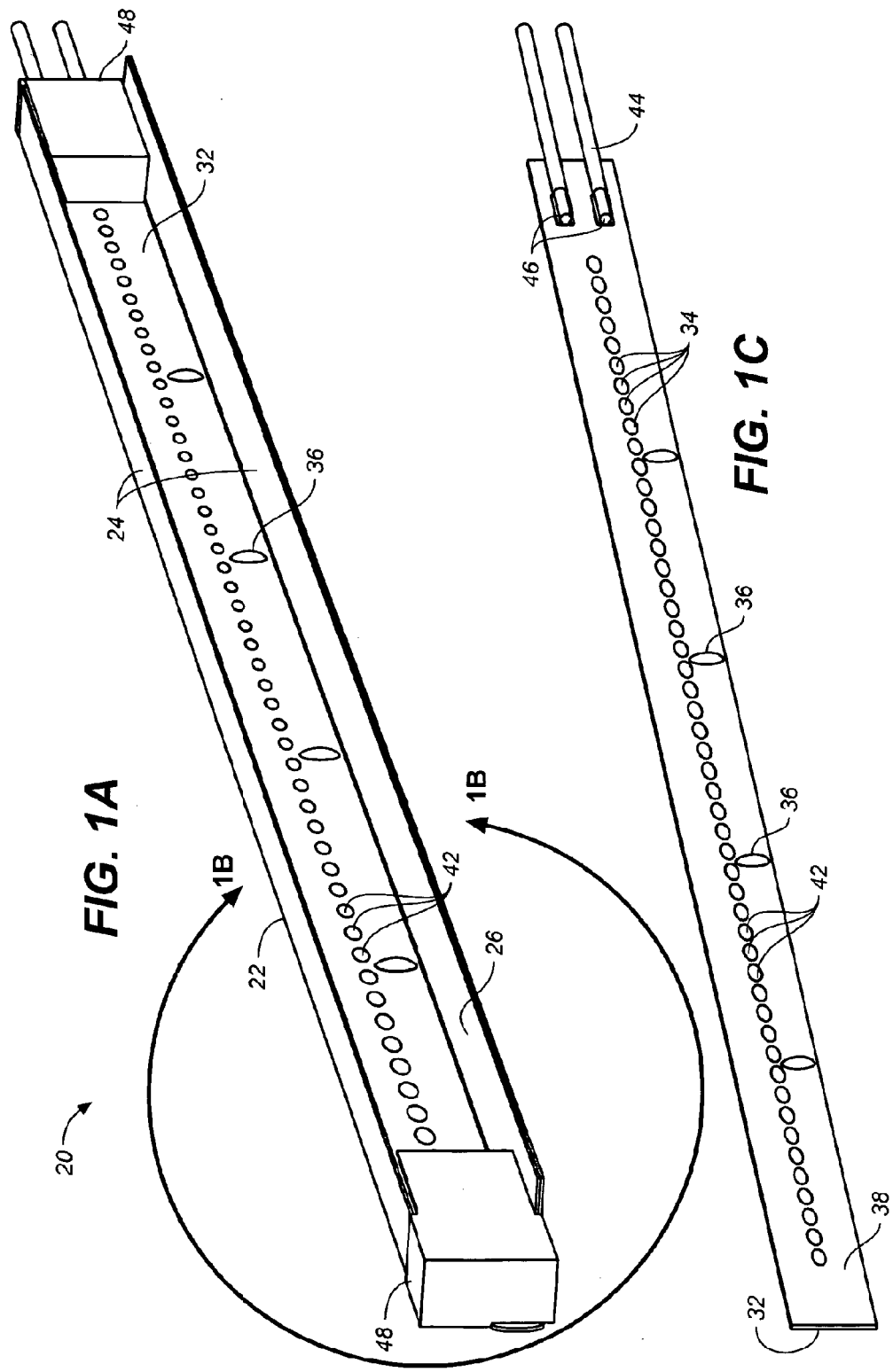

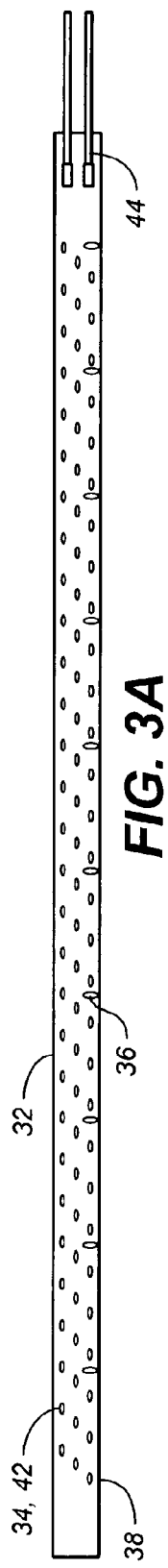
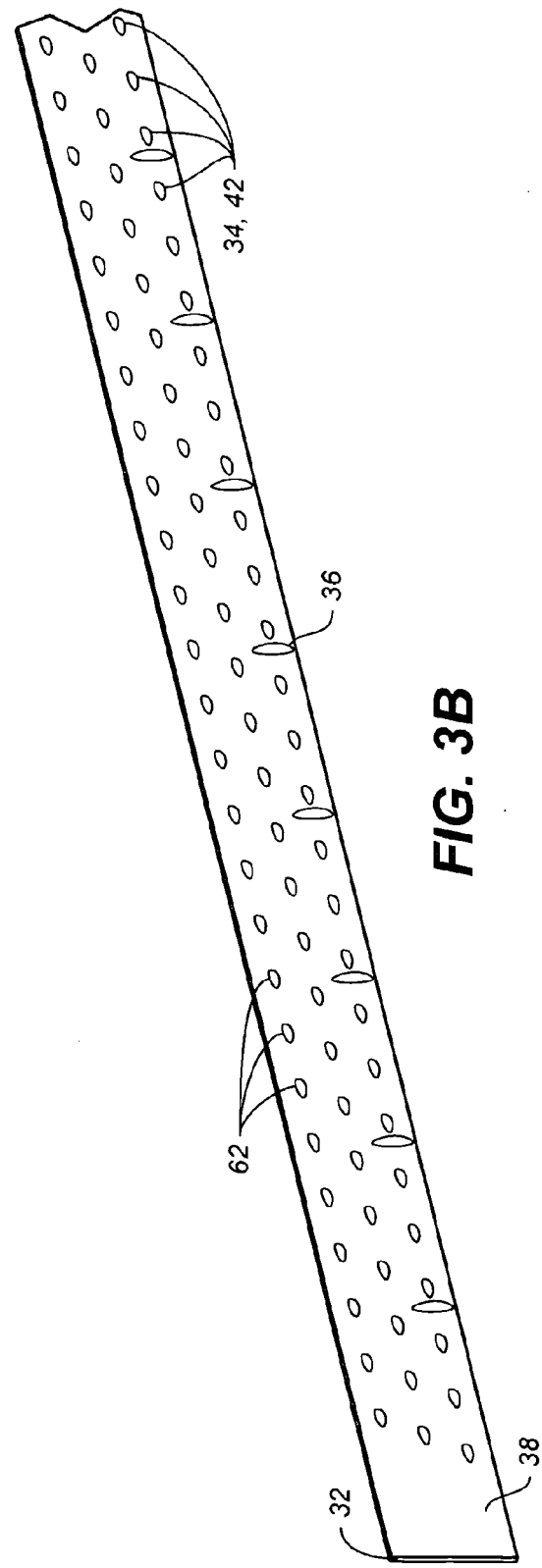
FIG. 3A
FIG. 3B

HIGH OUTPUT LED BASED ILLUMINATOR THAT REPLACES CCFLS FOR LCD BACKLIGHTS

TECHNICAL FIELD

The present disclosure relates generally to the technical field of liquid crystal displays ("LCDs") and, more particularly, to backlighting for LCD displays.

BACKGROUND ART

Cold cathode fluorescent lamp ("CCFL") backlighting for LCD displays, particularly those which require greater total luminous flux such as sunlight readable displays and LCD monitors, include secondary, non-imaging optical elements such as light pipes or integrating cavities. These secondary, non-imaging optical elements redistribute light from the CCFL into a more or less uniform area light source located behind the display.

LCD display backlighting systems using linear CCFL's advantageously exploit their characteristic that over most of its length a linear CCFL produces a uniformly illuminated cylinder of light. The uniform cylinder of light emitted by a CCFL can be readily transformed into an area source predominately by mounting the CCFL in an illuminator housing made of machine stamped metal such as aluminum or steel, and spreading the illumination in a linear fashion in a direction perpendicular to the CCFL tube's longitudinal axis. Since linear CCFLs are cylindrically radiating light sources, it proves difficult and inefficient to capture and direct all the light they emit exclusively onto the input aperture of an edge illuminated light pipe.

For secondary, non-imaging optical elements based upon a light pipe, also called edge-lit backlights, the CCFL's uniform cylinder of illumination conflicts, to some degree, with the flat strip nature of the light pipe's input surface, i.e., one or more edges of the light pipe. Efficiently transferring light emitted by a CCFL into a light pipe requires that the cross-sectional area of the light pipe's input surface should be roughly the same as the CCFL's cylindrical radiating area. However, the design of many modern electronic products that employ a backlit LCD require keeping the blacklight both as thin and as efficient as possible. This requirement for a concurrently thin and efficient LCD backlighting system could be readily solved if CCFLs could be made arbitrarily thin and still maintain its luminous output at a practical energizing voltage. Unfortunately, below about 2.0 mm diameter both the luminous output and practicality of CCFLs tend to decline precipitously. Consequently, most light pipe based backlighting systems tend to be inefficient, and to be dimmer in comparison with thicker, integrating cavity-type backlighting systems.

The highest efficiency and output mini CCFL based backlights used in currently available LCD modules typically omit the light pipe replacing it with an array of four (4) or more CCFL lamps located directly behind the LCD. Typically, the array of CCFLs is enclosed in a highly reflective integrating light box to generate and deliver increased luminous flux to the rear of the LCD. Unfortunately, these systems exhibit the following disadvantages.

1. Such CCFL illuminators add significant thickness to the overall LCD module, as much as 10 mm or more increased thickness.
2. These CCFL illuminators require using a high-output, multi-channel, high voltage inverter and lead wiring to drive the greater number of light sources. High-output, multi-channel, high voltage inverters tend to be heavy, bulky and often have moderately low electrical efficiency, 70%-80% efficiency is typical.
3. As is true for all CCFL light sources, at low ambient temperatures mini CCFL based backlights are increasingly difficult to start, and require:
    a. a very high start-up voltage, typically exceeding 1000 volts; and
    b. a warm-up period that can be as long as several minutes before reaching their more efficient and higher output operating temperature range.
4. CCFL lamps, including mini CCFLs, produced essentially all their heat inside their glass envelope making heat sinking, and cooling difficult to accomplish and control. Furthermore, commercial CCFL based LCD modules typically avoid thermally coupling CCFL lamp(s) to a system's case because the CCFL is designed to operate most efficiently when self-heated.
5. Dimming CCFL lamps, including mini CCFLs, is difficult and often expensive particularly when there is an array of four (4) or more lamps to control simultaneously, and particularly when the ambient temperature is very low as in situations of cold weather start-up. Consequently, it is uncommon for CCFL backlights to exhibit a dimming range of more than about 250:1.

Furthermore, most of CCFLs used today include elemental mercury in their construction. Mercury is a well know biohazard that is extremely toxic to humans and the environment. For that reason many governments around the world are actively legislating to exclude these kinds of dangerous materials from commercial products. Commercial electronic products that will be affected by a mercury prohibition include flat screen TVs, flat screen computer monitors and laptop and notebook computers.

Light emitting diodes ("LEDs") offer a near-term practical alternative to CCFLs as illumination sources for LCD backlighting. Over time LED light sources have become progressively brighter and more energy efficient while their cost continues to decline. Today, LEDs are ubiquitous in a wide array of commercial products. However, LEDs provide a small, intense and usually square or rectangular light source more accurately characterized as pseudo-point light source.

The pseudo-point light source characteristic of LEDs makes the optical problem of redistributing their light to provide an area illumination source suitable for LCD backlighting more complex than for a CCFL. Attempting to use LEDs for LCD backlighting requires that distribution optics simultaneously spread light emitted by a LED uniformly along two (2) axes compared with the requirement that light emitted by a CCFL needs to be spread essentially along only a single axis. The fact that many LED backlighting systems employ a multiplicity of sources often packaged as discrete components, possibly of different colors such as red, green and blue, exacerbates the problem of distribution optics. Consequently, any commercially practicable LED backlighting system must uniformly mix light emitted from several distinct illumination sources, and perhaps even the source's colored light, while concurrently redistributing the illumination into an area.

As described above for CCFL backlighting, the design of many modern electronic products that employ a backlit LCD require keeping the blacklight both as thin and as efficient as possible. Furthermore, modern electronic products often require a small footprint. These requirements imposed by modern electronic products further constrains the task of mixing and distributing light emitted by LEDs when used for LCD backlighting.

Lastly, many currently available backlit LCD modules employ one or two CCFL illuminators for providing light to the light pipe that in turn, more or less uniformly, redistributes the CCFL's light into an area of illumination which matches the LCD's viewable area. Accordingly, a high intensity LED backlight illuminator for LCD modules that is capable of directly replacing CCFL illuminators and which requires no or minimal additional mechanical changes to the LCD module would be advantageous. However, since LEDs are pseudo-point light sources rather than cylindrical sources, as stated above, great care must be taken to mix into a uniform strip of illumination light emitted by LEDs that impinges upon the input surface of the LCD module's light pipe. Forming a uniform strip of illumination with light emitted from LEDs is challenging since most LCD modules provide only a few millimeter spacing between an inner edge of a frame of the LCD's module and the input surface of the module's light pipe.

Disclosure

An object of the present disclosure is to provide an improved illuminator for LCD modules.

Yet another object of the present disclosure is to provide an improved illuminator for commercial off the shelf ("COTS") LCD modules.

Yet another object of the present disclosure is to provide an improved illuminator adapted for replacing typical CCFL illuminators included in COTS LCD modules.

Yet another object of the present disclosure is to provide an improved illuminator for LCD modules which is simply and easily manufactured.

Yet another object of the present disclosure is to provide an improved illuminator for LCD modules which facilitates maintenance and repair thereof.

LEDs offer a near-term practical alternative to CCFLs as an illumination source for LCD backlighting. The present disclosure addresses shortcomings of LEDs as an area illumination source for LCD backlighting.

Briefly, in one aspect the present disclosure includes a LCD illuminator which when energized is adapted for emitting light which impinges upon an input surface of a light pipe. As described above, the light pipe transforms light impinging thereon into an area source for backlighting a LCD of a LCD module. A LCD illuminator in accordance with the present disclosure includes a thermally conductive housing to which a thermally conductive printed circuit board ("PCB") is mechanically and thermally bonded. The PCB has an array of LED die mounted thereon on a surface of the PCB that faces away from the thermally conductive housing. Finally, the LCD illuminator includes a layer of thermal interface material interposed between an outer surface of the thermally conductive housing and a LCD module that receives the LCD illuminator.

In another aspect the present disclosure includes an improved LCD module that has a LCD and a light pipe. The light pipe has an input surface adapted for receiving light and transforming the received light into an area source for backlighting the LCD. The improved LCD modules further includes the disclosed LCD illuminator as characterized in the immediately preceding paragraph.

An advantage of a LCD illuminator in accordance with the present disclosure is that the thin printed circuit board facilitates dissipating heat generated by LEDs included in the LCD illuminator.

Another advantage of a LCD illuminator in accordance with the present disclosure is that the thin printed circuit board spaces the LEDs further from the input surface of a light pipe which enhances mixing of light emitted by the LEDs that impinges upon the light pipe's input surface.

Yet another advantage of a LCD illuminator in accordance with the present disclosure is that it can deliver to the input aperture of an edge-lit light pipe as much as three (3) to ten (10) times the luminous flux provided by an equivalently sized CCFL illuminator.

Yet another advantage of a LCD illuminator in accordance with the present disclosure is that it permits the backlighting optics, i.e. light pipe, recycling films and rear reflector, of an LCD module to produce two (2) to three (3) times or more backlight output brightness in the same total backlight volume.

Alternatively, yet another advantage is that, if decreased system power consumption is desired rather than increased peak screen brightness, the disclosed LCD illuminator requires only one-third ($\frac{1}{3}$) to one-half ($\frac{1}{2}$) the power required for a CCFL illuminator that achieves the same screen brightness.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 1A is a perspective view illustrating a LED illuminator in accordance with the present disclosure that includes a PCB having an array of small LED die together with at least one current limiting resistor mounted thereon;

FIG. 1C is a perspective view illustrating a thin, thermally conductive PCB that is depicted in FIGS. 1A and 1B, and that has an array of small LED die together with at least one current limiting resistor mounted on the PCB;

FIGS. 3A and 3B are perspective views illustrating a PCB similar to that depicted in FIG. 1C which has an alternative embodiment configuration for the array of small LED die mounted thereon.

BEST MODE FOR CARRYING OUT THE DISCLOSURE

Figure 1B:
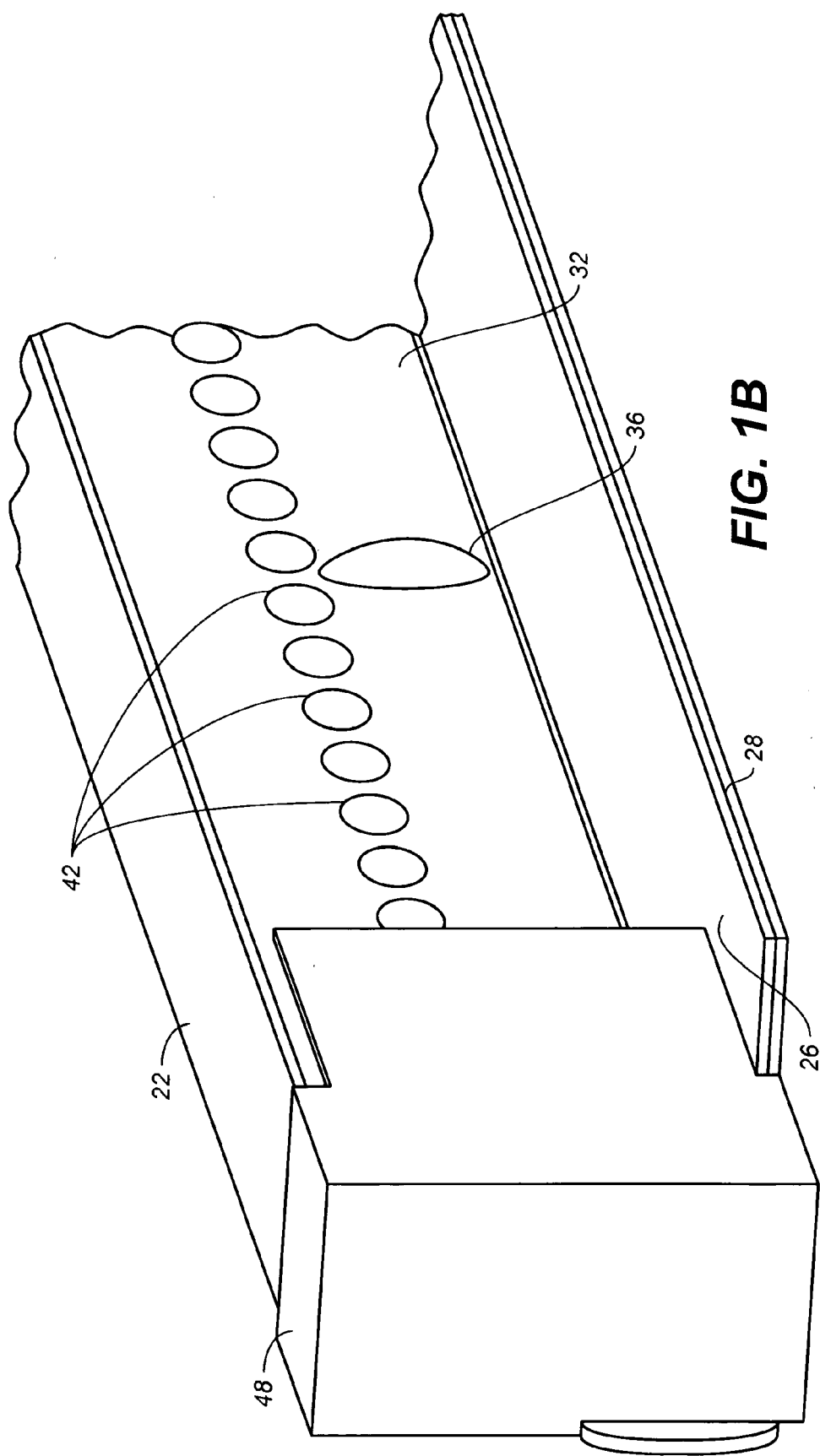
FIG. 1B is an enlarged perspective view illustrating a portion of the LED illuminator taken along the line 1B-1B in FIG. 1.

The perspective views of FIGS. 1A and 1B depict a LED illuminator in accordance with the present disclosure referred to by the general reference character 20. The LED illuminator 20 includes a thermally conductive housing preferably formed by an elongated channel 22 having a generally U-shaped cross-section with a substantially flat bottom surface. The channel 22 is typically made from a metal such as copper, nickel plated copper or aluminum. Inner surfaces of side walls 24 of the channel 22 are preferably covered with a highly light-reflective film 26 which can be specular or white. The light-reflective film 26 is preferably secured to the side walls 24 by a layer 28 of a pressure sensitive adhesive located therebetween.

Secured at the bottom of the channel 22 between its side walls 24 is a PCB 32 that preferably is thin, 0.5 mm thick or less, that exhibits good thermal conductivity. In addition to conventional PCB epoxy/glass materials such as FR4, the PCB 32 can also be made from materials such as T-Clad™ offered by The Bergquist Company located at 18930 W. 78th Street, Chanhassen, Minn. 55317, or RO4000 offered by Rogers Corporation, Advanced Circuit Materials Division, High Frequency Laminates located at 100 S. Roosevelt Avenue, Chandler, Ariz. 85226.

As best illustrated in FIG. 1C, mounted on a surface of the PCB 32 that faces away from the channel 22 and electrically interconnected on the PCB 32 is a linear array of square or rectangular LED die 34 together with at least one current limiting resistor 36. The LED die 34 are physically small, i.e., generally in the range of 0.20 mm×0.20 mm to approximately 1.0 mm×1.0 mm. The LED die 34 are mounted near each other, for example with a spacing between immediately adjacent LED die 34 being in a range of 1.0 mm to 4.0 mm. To minimize absorptive losses from back-reflected source illumination, the surface of the PCB 32 on which the LED die 34 are mounted that faces away from the channel 22 is preferably covered with a white or specular reflective film 38, and resistors 36 mounted on the PCB 32 are preferably over-coated with a white reflective material.

In accordance with the present disclosure, the PCB 32 is mechanically and thermally bonded to the bottom of the U-shaped channel 22 which locates the LED die 34 suitably for positioning near an input surface of a light pipe included in a LCD module. The very thin PCB 32 with the LED die 34 mounted thereon becomes mechanically rigid upon being bonded into the bottom of the U-shaped PCB 32. Since there generally is very little distance between an input surface of a light pipe included in a LCD module and the edge of the module's frame, using thin material for the PCB 32 increases the gap between the LED die 34 and the light pipe's input surface. Increasing the distance between the LED die 34 and the light pipe's input surface is very beneficial because it facilitates efficient mixing of the LED sources into a uniformly illuminated strip. Mixing of the LED sources into a uniformly illuminated strip avoids noticeable periodic brightness striations appearing on the light pipe's output surface near the illuminated edge thereof.

If the LED illuminator 20 is to provide a white light backlight without color adjustability, blue light LED die 34 are mounted on the PCB 32 and are covered with an encapsulant bead 42 that contains a down-converting phosphor. Upon absorbing blue light excitation from the LED die 34, the down-converting phosphor radiates yellow-green light which, when combined with un-absorbed portion of the LED's blue radiation, produces white light. The LED die 34 are interconnected to an external source of electrical power by at least a pair of wires 44 which may be attached to solder pads 46 on the PCB 32.

As depicted in FIGS. 1A and 1B, white reflective end caps 48 block light from escaping out opposite ends of the channel 22. The end caps 48 can be made from various different materials. However, molded white silicone is a particularly useful material for the end caps 48.

Figure 2A:
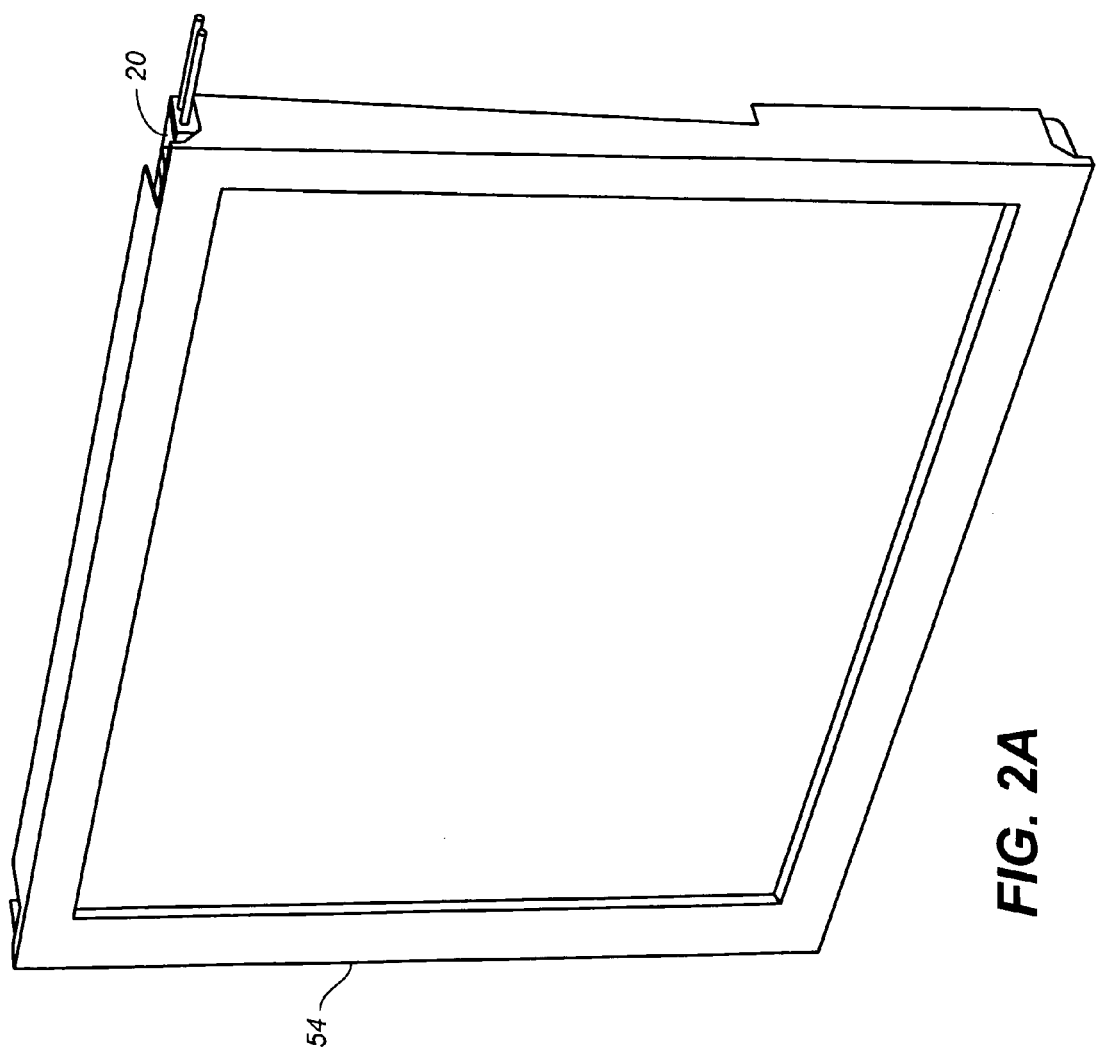
FIG. 2A is a perspective view illustrating a COTS LCD module.
Figure 2B:
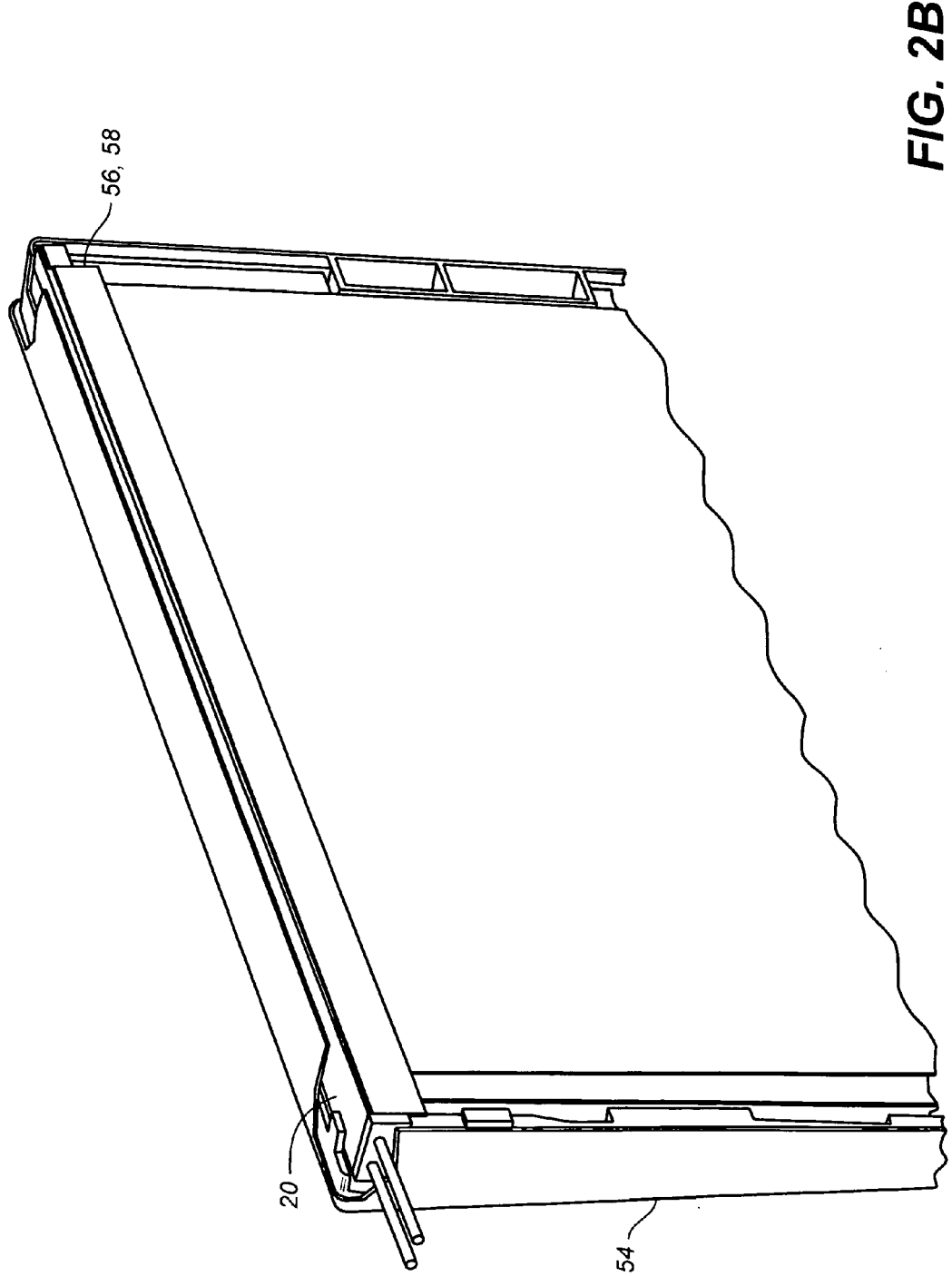
FIGS. 2B and 2C are perspective views respectively illustrating portions of the COTS LCD module depicted in FIG. 2A with the LED illuminator depicted in FIGS. 1B and 1C fitted into a cavity included therein that typically receives a conventional CCFL illuminator.
Figure 2C:
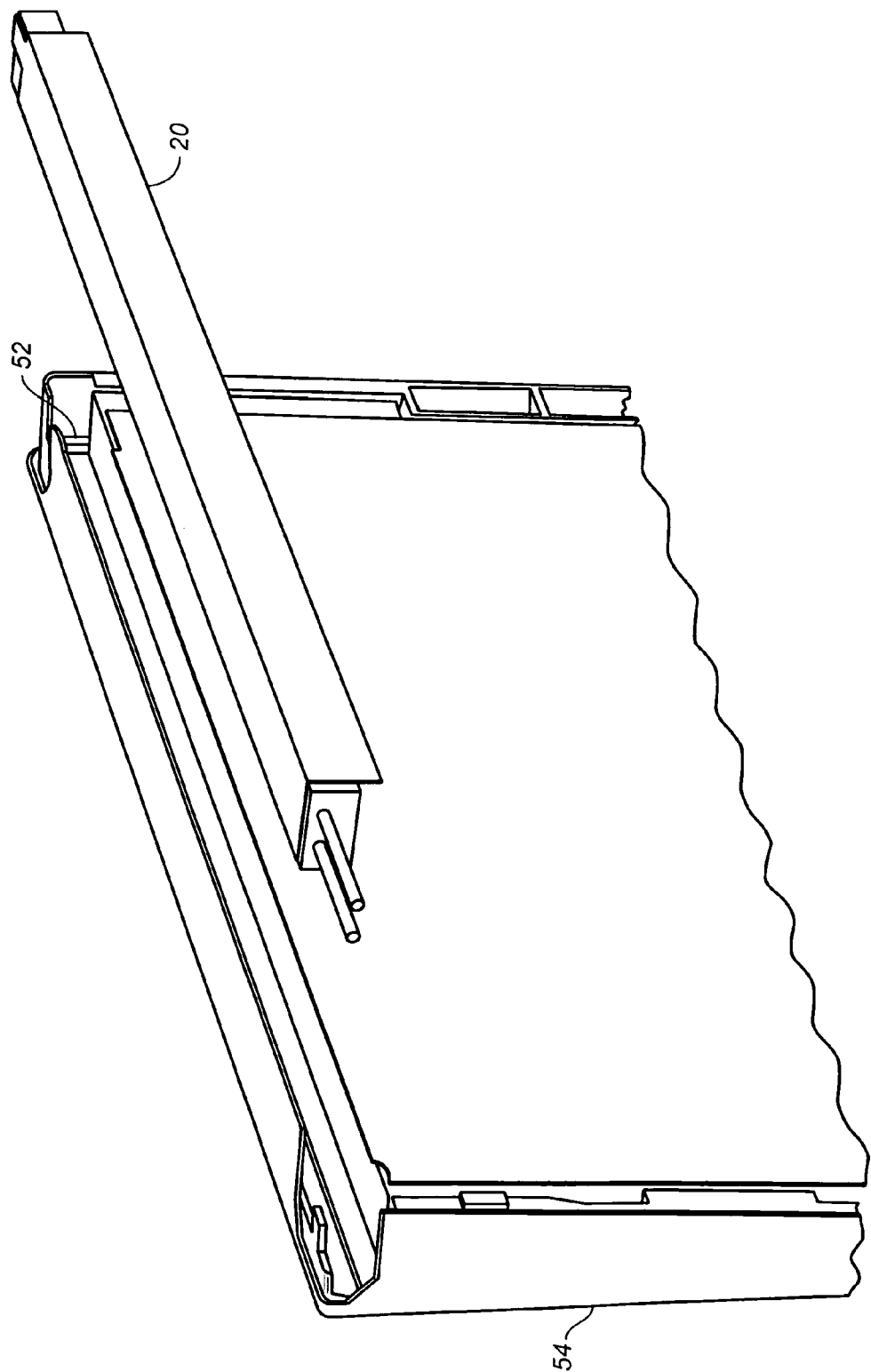

FIGS. 2A-2C illustrate that the LED illuminator 20 fits into an illuminator cavity 52 of a COTS LCD module 54 that usually receives a conventional CCFL illuminator. This is a significant advantage of the disclosed LED illuminator 20. In this way the disclosed LED illuminator 20 incorporates technological advantages of LED light sources into conventional COTS LCD modules 54. However obtaining these advantages requires an additional internal modification of COTS LCD module 54 that is part of the present disclosure. Specifically, because LEDs must have an effective thermal heat sink to exhibit optimum performance, the COTS LCD module 54 must provide a thermal path for dissipating heat generated by the LED die 34 included in the LED illuminator 20. Dissipating heat generated by the LED die 34 may be accomplished in various ways. However, the LED illuminator 20 preferably includes a thin layer (typically 0.125 mm to 0.75 mm thick) of a compliant and thermally conductive, thermal interface sheet material 56 secured to an outer surface 58 of the channel 22. Preferably, the thermal interface sheet material 56 is T-flex 210 offered by Laird Technologies—Thermal located at 4704 Detroit Avenue, Cleveland, Ohio 44102. To permit readily and non-destructively disassembling a COTS LCD module 54 that includes the LED illuminator 20, the material selected for the thermal interface sheet material 56 preferably will not adhere permanently to the COTS LCD module 54.

Instead of the thermal interface sheet material 56 secured to the outer surface 58 of the channel 22, the outer surface of the bottom of the channel 22 furthest from the LED die 34 can be coated with a compliant layer of silicone gel-like material that is loaded with a thermally conductive material such as alumina particles. This compliant layer is approximately one and one-eighth millimeter (0.125 mm) to three-quarters of a millimeter (0.75 mm) thick, and may be coated with a lubricant to facilitate sliding the LED illuminator 20 into the illuminator cavity 52 of the COTS LCD module 54.

Upon assembling the LED illuminator 20 into the illuminator cavity 52, the thermal interface sheet material 56 contacts a metal bezel or case of the COTS LCD module 54, that for clarity does not appear in the FIGs. Preferably, to conduct heat generated by the LED die 34 out of an entire system the region of the LCD module's bezel or case that absorbs heat from the channel 22 of the LED illuminator 20 is in turn thermally coupled either to an external heat sink, or to a case of a system that includes the COTS LCD module 54. In this way the disclosed LED illuminator 20 efficiently transfers heat from the LED die 34 to the thermally conductive channel 22 of the COTS LCD module 54. Upon reaching the channel 22, heat may be readily dissipated through the thermal interface sheet material or other equivalent thermally conductive structure by appropriate and generally straight forward thermal design of COTS LCD module 54 and its bezel or case.

As stated above, the light pipe included in a typical COTS LCD module 54 may be designed to redistribute light from one or more CCFL sources. FIGS. 3A and 3B depict an alternative arrangement for LED die 34 mounted on the PCB 32. In the alternative embodiment depicted in FIGS. 3A and 3B, the LED die 34 are mounted on the PCB 32 to form an array of diagonal rows 62, or in what may alternatively be described as a multi-row configuration. Arranged in the diagonal rows 62, the LED die 34 cover a greater amount of the illumination surface area available within the channel 22. Arranging the LED die 34 in diagonal rows reduces the amount of under-fill of the input aperture of the light pipe included in the COTS LCD module 54. Reducing the amount of under-fill improves brightness uniformity in the output area of the light pipe, particularly near its input end. The configuration for the LED die 34 depicted in FIGS. 3A and 3B also allows a greater number of LED die 34 to be mounted on the PCB 32 for use in COTS LCD modules 54 which require more luminous flux than that provided by the linear array of LED die 34 depicted in FIGS. 1A-1C.

INDUSTRIAL APPLICABILITY

Covering the LED die 34 with a down conversion phosphor, which is typically mixed into an epoxy or silicone based transparent encapsulant, is particularly advantageous for obtaining a uniform white light output from the LED array. Forcing all of the light from blue emitting LED die 34 to first travel through the encapsulant in which the down conversion phosphor captures and re-emits much of the light increases the effective size of the light sources, and decreases inter-source spacing of the light sources. This arrangement for the LED die 34 and the encapsulant bead 42 facilitates creating a uniformly illuminated strip with light sources that are spaced only a short distance from an input surface of a light pipe.

A thin down conversion phosphor layer deposited directly onto the LED die may be used rather than mixing the phosphor into an encapsulant. If this approach is used, the maximum allowable inter-die spacing for a uniform strip output will be decreased but, the luminous efficacy of the LED illuminator 20 will be increased. Using binned LED die 34 is advantageous if the LED illuminator 20 is to operate with high luminous efficacy, and/or produce high total luminous output.

Fabricating the channel 22 with a pressure sensitive adhesive material coating all of its interior surfaces is particularly advantageous for facilitating manufacture of the LED illuminator 20. Having adhesively coated material inside the channel 22 permits selectively removing a release film from the side walls of the channel 22 when bonding the light-reflective film 26 thereto. Similarly, removing release film from the bottom of the channel 22 facilitates bonding the PCB 32 thereto.

Because the disclosed LED illuminator 20 provides high thermal conduction efficiency, a large number of LED die 34 can be mounted onto the PCB 32. Mounting a large number of LED die 34 on the PCB 32 significantly increases the total illumination available from the LED illuminator 20 in comparison with the total illumination available from a CCFL illuminator of the same volume and area. Also, for smaller sized COTS LCD modules 54, for example sizes under about fifteen (15) inches in screen diagonal, the highest efficiency binned LED die 34 available commercially permit a luminous efficacy for the disclosed LED illuminator 20 that significantly exceeds that produced by a CCFL illuminator of the same overall length.

Combining the two preceding factors, for the same screen brightness, using the LED illuminator 20 provides LCD modules that require as little as one-third (⅓) or less power than an equivalent CCFL illuminator. Conversely, this same LED illuminator 20 can be driven to a significantly higher power density than the equivalent CCFL illuminator, and will therefore produce as much as three (3) to four (4) times or more maximum screen brightness as the CCFL illuminator. Either of these advantages can be realized without changing the outside dimensions of the COTS LCD module 54. A COTS LCD module 54 which includes the disclosed LED illuminator 20 is plainly readable in direct sunlight while simultaneously consuming a lesser amount of electrical power than an equivalent CCFL illuminator.

The disclosed LED illuminator 20 allows a handheld product that includes a LCD module to reduce backlight power consumption while simultaneously saving space in comparison with a CCFL illuminator because the LED illuminator 20 does not require a high voltage inverter. Furthermore, LED backlight controllers are generally more efficient than a CCFL inverter and operate at much lower voltage. This provides additional advantages for the manufacturer of products which include COTS LCD modules 54.

Another feature of the disclosed LED illuminator 20 is the electrical arrangement of the array of the LED die 34. The typical forward voltage drop of blue emitting LED die used in the white light array is 3.2 volts. If an array of roughly forty (40) or more LED die 34 are mounted on the PCB 32 and if the LED die 34 are interconnected in parallel arrangement, then the LED drive current is relatively high. Conversely, if the LED die 34 are connected in series, then the current is low but the voltage is correspondingly higher. An advantageous interconnection for the LED die 34 is one in which groups of series connected LED die 34 are in turn connected in parallel. Depending on the overall design of the COTS LCD module 54, it is advantageous if each group includes from five (5) to twelve (12) LED die 34 connected in series. Electrical current flowing through the series connected groups of LED die 34 can be balanced by including a current limiting resistor in each series connected string of LED die 34. For optimum efficiency, the value chosen for the current limiting resistor should make resistor power dissipation very small in comparison with power dissipated across the series connected string of LED die 34. Such an interconnection for an array containing a large number of LED die 34 requires only a modest amount of current and operates at a voltage which is low enough to avoid most voltage-related design complications as well as regulatory agency restrictions.

When the LED die 34 are configured into the diagonal rows 62 as depicted in FIGS. 3A and 3B, if each diagonal row 62 includes individual red, blue and green LED die 34 then encapsulant beads 42 containing a scattering material such as aluminum oxide particles or hollow microspheres instead of a down conversion phosphor material can be advantageously applied to the LED die 34. Similar to the encapsulant beads 42 containing a down converting phosphor, coating the LED die 34 with encapsulant beads 42 containing a scattering material increases the effective size of the light sources, and decreases inter-source spacing of the light sources.

When the LED die 34 are configured as described in the preceding paragraph, advantageously the LED die 34 are electrically interconnected in the same series-parallel arrangement described above. Particularly advantageously the red LED die 34 are electrically interconnected in series into one or more first groups, blue LED die 34 are interconnected in series into one or more second groups, and LED die 34 are interconnected into one or more third groups. This grouping of the LED die 34 permits energizing each group individually thereby increasing the number of wires 44 from two (2) to at least four (4) and perhaps six (6). However, this interconnection of the red, blue and green LED die 34 advantageously permits controlling the intensity of light emitted by each group of LED die 34 individually which permits providing the LCD with backlighting of differing colors. Also, since most currently available red LED die 34 tend to operate at a lower voltage than most currently available green and blue LED die 34, by appropriately selecting the number of LED die 34 in each of the individual series connected strings of LED die 34, the same or very similar input voltage can be applied for energizing the three different types of LED die 34.

Although the present invention has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications of the disclosure will, no doubt, be suggested to those skilled in the art after having read the preceding disclosure. Accordingly, it is intended that the following claims be interpreted as encompassing all alterations, modifications, or alternative applications as fall within the true spirit and scope of the disclosure.

What is claimed is:

1. A liquid crystal display ("LCD") illuminator which when energized is adapted for emitting light which impinges upon an input surface of a light pipe, the light pipe transforming light impinging upon the input surface thereof into an area source for backlighting a LCD of a LCD module, the LCD illuminator comprising:
   a) a thermally conductive housing;
   b) a thermally conductive printed circuit board ("PCB") (32) that is mechanically and thermally bonded to the thermally conductive housing, the PCB (32) having an array of LED die (34) mounted thereon on a surface thereof that faces away from the thermally conductive housing, the PCB (32) also electrically interconnecting the LED die (34) mounted thereon; and
   c) a layer of thermal interface material (56) interposed between an outer surface (58) of the thermally conductive housing and a LCD module that receives the LCD illuminator wherein the thermal interface material 56) does not permanently adhere to the LCD module;
   whereby the LCD illuminator simultaneously:
   a) facilitates dissipating from the LCD module heat generated by the LED die (34) included in the LCD illuminator; and
   b) enhances mixing of light emitted by the LED die (34) that impinges upon the input surface of the light pipe included in the LCD module.

2. The LCD illuminator of claim 1 wherein the thermally conductive housing is formed in the shape of an elongated channel (22) having a substantially flat bottom surface.

3. The LCD illuminator of claim 2 wherein the channel (22) is formed with a U-shaped cross-section.

4. The LCD illuminator of claim 1 wherein the thermally conductive housing is made from a metal.

5. The LCD illuminator of claim 4 wherein metal forming the thermally conductive housing is selected from a group consisting of copper, nickel plated copper and aluminum.

6. The LCD illuminator of claim 1 wherein a light-reflective film (26) covers an inner surface of a wall (24) of the thermally conductive housing.

7. The LCD illuminator of claim 1 wherein the PCB (32) has a thickness that does not exceed one-half millimeter (0.5 mm).

8. The LCD illuminator of claim 1 wherein material forming the PCB (32) is selected from a group consisting of FR4, T-Clad™ and RO4000.

9. The LCD illuminator of claim 1 wherein spacing between immediately adjacent LED die (34) is between one millimeter (1.0 mm) and four millimeters (4.0 mm).

10. The LCD illuminator of claim 1 wherein the electrical interconnection of LED die (34) organizes them into separate groups of series connected LED die (34) containing between five (5) and twelve (12) LED die (34), the series-connected groups in turn being electrical interconnection in parallel.

11. The LCD illuminator of claim 1 wherein mounted on the PCB (32) are LED die (34) which respectively emit red, green and blue light, and the electrical interconnection of LED die (34) organizes the LED die (34) into at least three (3) separate strings of series connected LED die (34) which respectively include only red emitting LED die (34), only green emitting LED die (34), and only blue emitting LED die (34).

12. The LCD illuminator of claim 11 wherein the number of LED die (34) included in each of the strings of series connected LED die (34) is selected so all of the strings can be energized with substantially the same voltage.

13. The LCD illuminator of claim 1 wherein an encapsulant bead is applied to the LED die (34).

14. The LCD illuminator of claim 13 wherein the encapsulant bead contains a down conversion phosphor material.

15. The LCD illuminator of claim 13 wherein the encapsulant bead contains a scattering material.

16. The LCD illuminator of claim 1 wherein the array of LED die (34) is a linear array.

17. The LCD illuminator of claim 1 wherein the array is formed by diagonal rows (62) of LED die (34).

18. The LCD illuminator of claim 1 wherein the array is formed by multiple rows of LED die (34).

19. The LCD illuminator of claim 1 wherein a reflective film (38) selected from a group consisting of white and specular material covers the surface of the PCB (32) on which the LED die (34) are mounted that faces away from the thermally conductive housing.

20. The LCD illuminator of claim 1 further comprising at least one current limiting resistor 36 mounted on the PCB (32) that is electrically interconnected with the LED die (34) mounted thereon.

21. The LCD illuminator of claim 20 wherein the at least one current limiting resistor 36 mounted on the PCB (32) is over-coated with a white reflective material.

22. The LCD illuminator of claim 1 wherein the thermal interface material (56) is compliant.

23. The LCD illuminator of claim 1 wherein the thermal interface material (56) has a thickness that does not exceed three-quarters of a millimeter (0.75 mm).

24. An improved LCD module comprising:
   a) a LCD;
   b) a light pipe having an input surface adapted for receiving light and transforming the received light into an area source for backlighting the LCD; and
   c) a LCD illuminator which when energized emits light which impinges upon the input surface of the light pipe, the LCD illuminator including:
      i. a thermally conductive housing;
      ii. a thermally conductive PCB (32) that is mechanically and thermally bonded to the thermally conductive housing, the PCB (32) having an array of LED die (34) mounted thereon on a surface thereof that faces away from the thermally conductive housing, the PCB (32) also electrically interconnecting the LED die (34) mounted thereon; and
      ii. a layer of thermal interface material (56) interposed between an outer surface (58) of the thermally conductive housing and a surface of the LCD module that is juxtaposed with the thermally conductive housing wherein the thermal interface material (56) does not permanently adhere to the LCD module;
   whereby the LCD illuminator simultaneously:
   a) facilitates dissipating from the LCD module heat generated by the LED die (34) included in the LCD illuminator; and
   b) enhances mixing of light emitted by the LED die (34) that impinges upon the input surface of the light pipe.

25. The improved LCD module of claim 24 wherein the thermally conductive housing is formed in the shape of an elongated channel (22) having a substantially flat bottom surface.

26. The improved LCD module of claim 25 wherein the channel (22) is formed with a U-shaped cross-section.

27. The improved LCD module of claim 24 wherein the thermally conductive housing is made from a metal.

28. The improved LCD module of claim 27 wherein metal forming the thermally conductive housing is selected from a group consisting of copper, nickel plated copper and aluminum.

29. The improved LCD module of claim 24 wherein a light-reflective film (26) covers an inner surface of a wall (24) of the thermally conductive housing.

30. The improved LCD module of claim 24 wherein the PCB (32) has a thickness that does not exceed one-half millimeter (0.5 mm).

31. The improved LCD module of claim 24 wherein material forming the PCB (32) is selected from a group consisting of FR4, T-Clad™ and RO4000.

32. The improved LCD module of claim 24 wherein spacing between immediately adjacent LED die (34) is between one millimeter (1.0 mm) and four millimeters (4.0 mm).

33. The improved LCD module of claim 24 wherein the electrical interconnection of LED die (34) organizes them into separate groups of series connected LED die (34) containing between five (5) and twelve (12) LED die (34), the series-connected groups in turn being electrical interconnection in parallel.

34. The improved LCD module of claim 24 wherein mounted on the PCB (32) are LED die (34) which respectively emit red, green and blue light, and the electrical interconnection of LED die (34) organizes the LED die (34) into at least three (3) separate strings of series connected LED die (34) which respectively include only red emitting LED die (34), only green emitting LED die (34), and only blue emitting LED die (34).

35. The improved LCD module of claim 34 wherein the number of LED die (34) included in each of the strings of series connected LED die (34) is selected so all of the strings can be energized with substantially the same voltage.

36. The improved LCD module of claim 24 wherein an encapsulant bead is applied to the LED die (34).

37. The improved LCD module of claim 36 wherein the encapsulant bead contains a down conversion phosphor material.

38. The improved LCD module of claim 36 wherein the encapsulant bead contains a scattering material.

39. The improved LCD module of claim 24 wherein the array of LED die (34) is a linear array.

40. The improved LCD module of claim 24 wherein the array is formed by diagonal rows (62) of LED die (34).

41. The improved LCD module of claim 24 wherein the array is formed by multiple rows of LED die (34).

42. The improved LCD module of claim 24 wherein a reflective film (38) selected from a group consisting of white and specular material covers the surface of the PCB (32) on which the LED die (34) are mounted that faces away from the thermally conductive housing.

43. The improved LCD module of claim 24 further comprising at least one current limiting resistor 36 mounted on the PCB (32) that is electrically interconnected with the LED die (34) mounted thereon.

44. The improved LCD module of claim 43 wherein the at least one current limiting resistor 36 mounted on the PCB (32) is over-coated with a white reflective material.

45. The improved LCD module of claim 24 wherein the thermal interface material (56) is compliant.

46. The improved LCD module of claim 24 wherein the thermal interface material (56) has a thickness that does not exceed three-quarters of a millimeter (0.75 mm).

* * * * *